(12) United States Patent
Mori et al.

(10) Patent No.: US 6,621,187 B2
(45) Date of Patent: Sep. 16, 2003

(54) ROTARY ELECTRIC POWER GENERATOR

(75) Inventors: Hideaki Mori, Chiyoda (JP);
Shigekazu Kieda, Ishioka (JP);
Masayuki Kaiho, Chiyoda (JP);
Ryoichi Shiobara, Hitachi (JP);
Kenichi Hattori, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/216,756

(22) Filed: Aug. 13, 2002

(65) Prior Publication Data

US 2002/0185923 A1 Dec. 12, 2002

Related U.S. Application Data

(62) Division of application No. 09/642,016, filed on Aug. 21, 2000, now Pat. No. 6,459,180.

(30) Foreign Application Priority Data

Sep. 17, 1999 (JP) ............................................ 11-263233

(51) Int. Cl.⁷ .............................. H02K 3/00; H02K 1/20
(52) U.S. Cl. .......................................... 310/61; 310/201
(58) Field of Search .......................... 310/58, 59, 60 R, 310/61, 60 A, 201, 208

(56) References Cited

U.S. PATENT DOCUMENTS

| | | | | |
|---|---|---|---|---|
| 2,755,395 A | | 7/1956 | Kilner ........................ 310/61 |
| 3,119,033 A | * | 1/1964 | Horsley et al. ................ 310/64 |
| 4,543,503 A | * | 9/1985 | Kaminski et al. ............. 310/59 |
| 4,634,910 A | * | 1/1987 | Schollhorn ................... 310/214 |
| 5,468,907 A | * | 11/1995 | Frankenhauser et al. ... 174/15.6 |
| 5,685,063 A | | 11/1997 | Prole et al. .................... 310/58 |
| 5,777,406 A | * | 7/1998 | Bomba et al. ................. 310/61 |
| 5,886,434 A | | 3/1999 | Nygard ......................... 310/61 |

FOREIGN PATENT DOCUMENTS

JP          9285052          10/1997

\* cited by examiner

Primary Examiner—Tran Nguyen
(74) Attorney, Agent, or Firm—Antonelli, Terry, Stout & Kraus, LLP

(57) ABSTRACT

A turbine electric power generator is provided with winding slots and sub-slots of a rotor; rotor windings having conductors and insulation materials laminated alternately thereon; wedges; and radial ventilation flow passages communicating the sub-slots with through holes of the wedges. In this turbine electric power generator, a projection is provided on an inner face of the radial ventilation flow passages, and the projection height is changed at a rotational axial position. In this manner, there can be provided a gas cooling type rotary electric power generator for turbine with its high cooling performance and high reliability at a low cost.

7 Claims, 12 Drawing Sheets

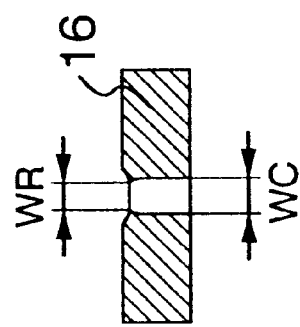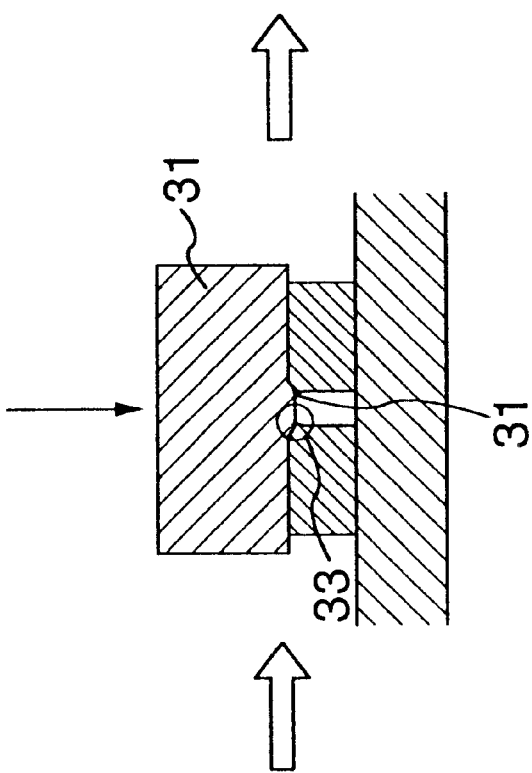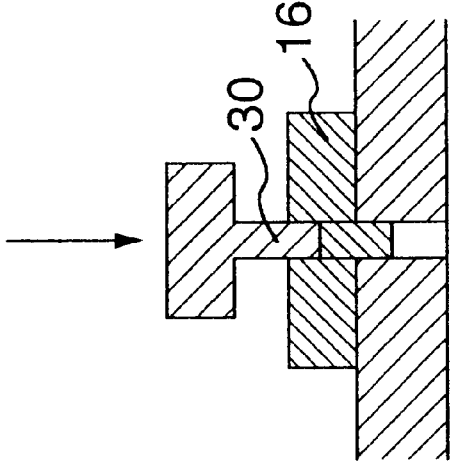

ROTARY ELECTRIC POWER GENERATOR

CROSS REFERENCE TO RELATED APPLICATION

This is a divisional of U.S. application Ser. No. 09/642,016, filed Aug. 21, 2000, now U.S. Pat. No. 6,459,180, the subject matter of which is incorporated by reference herein.

BACKGROUND OF THE INVENTION

The present invention relates to a rotary power generator such as an electric power generator. In particular, the present invention relates to a cooling structure of a gas direct cooling type of rotary electric power generator having a large capacity.

An electric power generator, in particular, a turbine electric power generator has a plurality of rotor windings or winding slots formed in an axial direction in which the windings are disposed. These winding slots are disposed with intervals on a peripheral face of a rotor main body at both sides of a magnetic pole part of the rotor main body, and a plurality of windings configuring the same magnetic poles are disposed coaxially around the magnetic poles. These windings are formed by superimposing a winding conductor by a plurality of turns in a radial direction, and insulation layers are provided between the turns. When electric power is supplied from the outside to these windings, a required electromagnetic field is generated at a respective one of the magnetic poles. The windings are rigidly fixed to the inside of the winding slots by means of wedges in the rotor so as not to be flied in the winding outer diameter direction by a strong centrifugal acceleration caused by rotation of the rotor. In addition, the windings are fixed by a cylindrical retaining ring provided so as to be in contact with the winding peripheral part.

The winding conductor is Joule-heated by supplying electric power to the windings. The insulation layers of the windings use a material having its high heat resistance such as mica; however, the limit of the allowable temperature of the insulation is 130° C. (B type of insulation material) or 155° C. (F type of insulation material). In addition, heat expansion of the winding conductor due to a temperature rise imparts large distortion to the windings and rotor, and causes rotational vibration. For this reason, as described in JP-A-9-285052 specification, a structure called a radial flow cooling system has been adopted to cool the windings by cooling fluid so as not to increase the winding temperature. In this structure, a sub-slot that is a ventilation flow passage from an end of the windings is provided at the bottom of the winding slot, and a number of flow passages are provided in a radial direction while electrical insulation between the turns is maintained. A hole is provided at a wedge so that this flow passage communicates with the rotor outer diameter side. When occasion demands, an axial flow cooling flow passage having a cooling flow passage provided in the longitudinal direction of the conductor may be combined with a radial flow passage. In this manner, the cooling fluid can be supplied from the sub-slot to the cooling flow passage formed at the rotor windings, and the winding temperature can be restricted to a predetermined temperature or less by forcibly cooling the rotor windings. Air or hydrogen is generally employed for the cooling fluid. Any fluid other than these can be principally used, but these two gases are frequently employed in view of safety or easiness of handling.

However, in the above prior art, there has been a problem that a divergent ventilation resistance caused when the cooling fluid diverges from the sub-slot in each radial flow passage is non-uniform at the axial position of each sub-slot, thus causing non-uniformity at air distribution and causing non-uniformity at the axial position of the rotor. Therefore, in recent years, with an increase in heat load due to compactness of electric power generators, the temperature of the entire rotor windings increases, and a margin for the temperature limit is reduced. For this reason, it is required to provide means for providing a temperature rise at this part while the winding strength of the slot end is fully maintained. However, conventionally, there is no consideration of means for solving this problem, and there has been only one way to achieve a large capacity by means for reducing an output per electric power generator volume, that is, increasing the size of the electric power generator and reducing a heat load in order to ensure the output.

The cooling fluid is changed from air to hydrogen, thereby the temperature of the rotor windings can be satisfactorily reduced even in the conventional structure. However, the entire electric power generator must be structured to be fully closed, thus requiring special technique for a sealing structure. In addition, in air cooling, a peripheral device for managing the purity of hydrogen is also required. Thus, there is a disadvantage that the entire cost of the electric power generator plant is increased. Further, there has been a problem that hydrogen is a gas with its extremely high explosiveness, and extreme care must be taken in flammable environment including a turbine.

As described above, there has been a problem that, although the above prior art can cope with a large capacity of electric power generator, a unit price per electric power output cannot be reduced.

SUMMARY OF THE INVENTION

It is an object of the present invention to provide a rotary electric power generator with its high reliability at a low cost for an air cooling mechanism by improving a cooling performance of the rotary electric power generator without increasing its manufacturing cost.

In order to attain the foregoing object, according to the present invention, there is provided a structure of a rotary electric power generator comprising: a rotor; axial winding slots on the peripheral face of the rotor disposed with intervals in the circumferential direction at both sides of the magnetic pole parts of the rotor; sub-slots opening at the bottom of the winding slots; rotor windings arranged coaxially with respect to the magnetic pole, extending at and outside of the winding slots, and having conductor insulation materials laminated alternately thereon; wedges in which the rotor windings are fixed to the rotor in the winding slots; a retaining ring on the rotary shaft peripheral side of the rotary windings extending outside of the winding slots at both ends of the rotor; and insulation blocks interposed between wedges or retaining rings, wherein the rotor windings have a number of radial ventilation flow passages passing from the sub-slots to the insulation blocks and wedges, and a projection or rib is provided at the inner face of the radial flow passage.

There is provided another configuration in which a flow passage area for the radial flow passage is changed with a predetermined pitch, and a ratio of the maximum area to the minimum area is 2 or less.

There is provided a still another configuration in which a projection is provided at the inner face of a hole configuring the radial flow passage of the above conductor.

Further, there is provided a further configuration in which the longitudinal flow passage having a protrusive projection is provided with respect to the flow direction of the cooling fluid.

BRIEF DESCRIPTION OF THE DRAWINGS

FIG. 11 is a view illustrating a manufacturing method according to the present invention shown in FIG. 4, in which FIG. 11A shows a state when a hole is drilled by press, FIG. 11B shows a state when the hole periphery is plastically deformed, and FIG. 11C shows a state when a projection is formed;

DESCRIPTION OF THE PREFERRED EMBODIMENTS

Figure 1:
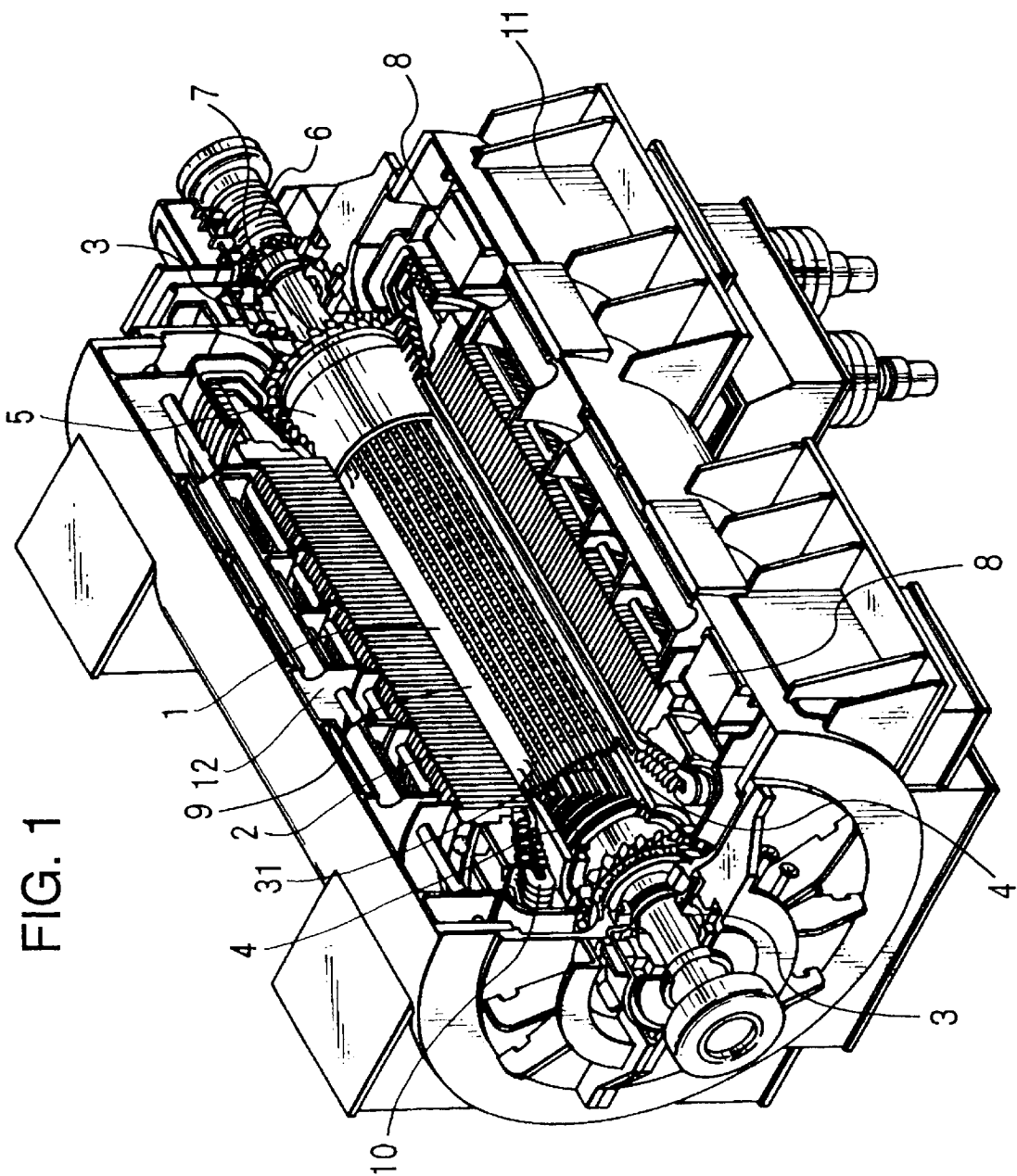
FIG. 1 is a view schematically illustrating a configuration of a turbine electric power generator.

A schematic structure of a turbine electric power generator will be described prior to describing embodiments of the present invention. FIG. 1 is a schematic structural view showing an example of an air cooling electric power generator to which the present invention is applied. However, a basic structure shown herein does not depend on cooling fluid type.

In FIG. 1, a rotor 1 is rotationally supported by a bearing 3 in a stator 2. In the rotor 1, a plurality of rotor windings 4 configuring the same magnetic poles are coaxially disposed around the magnetic poles, and are fixed. The centrifugal force acting to the rotor windings 4 is supported at the winding slots formed with intervals on the peripheral face of the rotor with respect to an axial part, and is rigidly supported at a retaining ring 5 with the peripheral part of the rotor end.

In the drawing, although only one side of a collector ring 6 for supplying a current to the rotor is shown for the purpose of illustrative convenience, the similar one is provided on the turbine side. A winding shaped structure of the winding slot and the rotor end will be described later. A fan 7 is disposed between the retaining ring 5 and a bearing, so that the air cooled by an air cooler 8 is circulated inside of an electric power generator. A duct is disposed so that the air supplied from the fan 7 can be supplied to a gap between the stator 2 and the rotor 1, so called an air gap 9 or an end of the stator windings. The stator 2 is supported by a stator frame 11, and the stator frame (not shown) is rigidly fixed onto a base.

Figure 2:
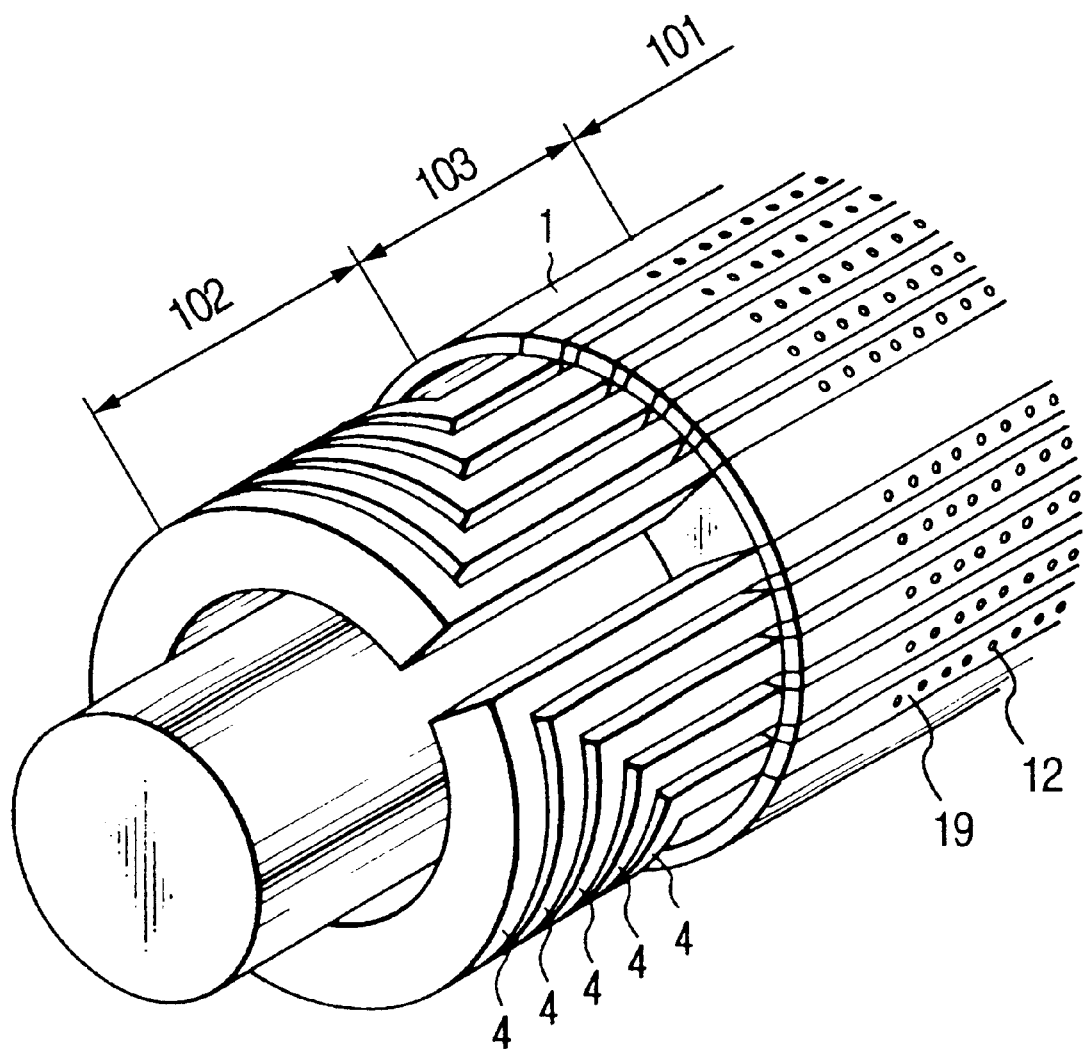
FIG. 2 is a view schematically illustrating a structure of an end of turbine electric power generator rotor windings.

FIG. 2 is a perspective view showing a winding shape of the rotor end. In the drawing, the retaining ring is not shown for the purpose of illustrative convenience. In addition, in the drawing, two magnetic poles are provided. In many cases, although a turbine electric power generator uses two or four magnetic poles, the number of magnetic poles are not limited thereto depending on use and output.

From the outside of a peripheral face, the retaining ring 5 holds the rotor windings 4 protruded from a slot of the rotor 1 to the rotor end. A hole 12 seen from the peripheral face of the rotor windings 4 of the rotor 1 is a hole drilled for a wedge 19 for supporting the rotor windings 4 against a centrifugal force, and is an air evacuation hole for a radial flow passage passing through a sub-slot and a rotor peripheral face described later. An arrow 101 is an axial section at which this radial flow passage can be provided, an arrow 102 is an end part of the rotor windings 4 exposed to the outside of the winding slot, and an arrow 103 sandwiched between both of these is a winding slot end. The winding slot end is a part for fixing the retaining ring 5 to the rotor 1, and is a section at which an air evacuation hole cannot be structurally provided at the wedge 19.

Figure 3:
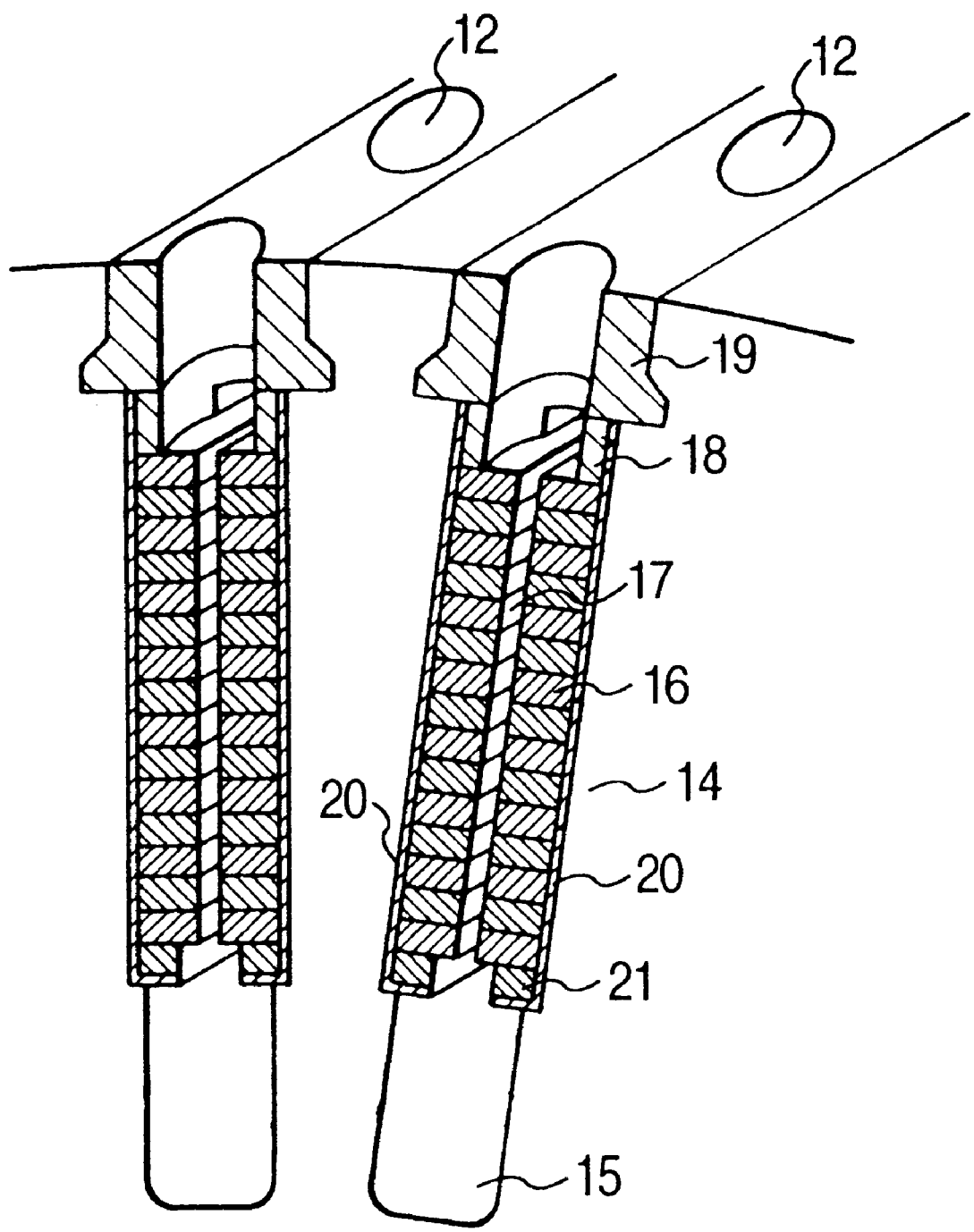
FIG. 3 is a perspective view illustrating a slot cross section of the rotor winding.

FIG. 3 is a perspective view of a winding slot sectional structure, which shows two slots. A sub-slot 15 is provided at the bottom of a winding slot 14 housing the rotor windings 4. This sub-slot 15 serves as an axial ventilation flow passage of the rotor 1 for the air supplied from the fan 7 shown in FIG. 1. The width of this sub-slot is configured by being narrower than that of the winding slot 14 so as to prevent a winding conductor 16 from slipping into the sub-slot. The rotor windings 4 are formed by radially superimposing the winding conductor 16 having a number of ventilation holes 17 punched thereon by a plurality of turns. Thin installation sheets (not shown) whose holes are punched at the same position as the winding conductor is sandwiched between these winding conductor turns.

Figure 4:
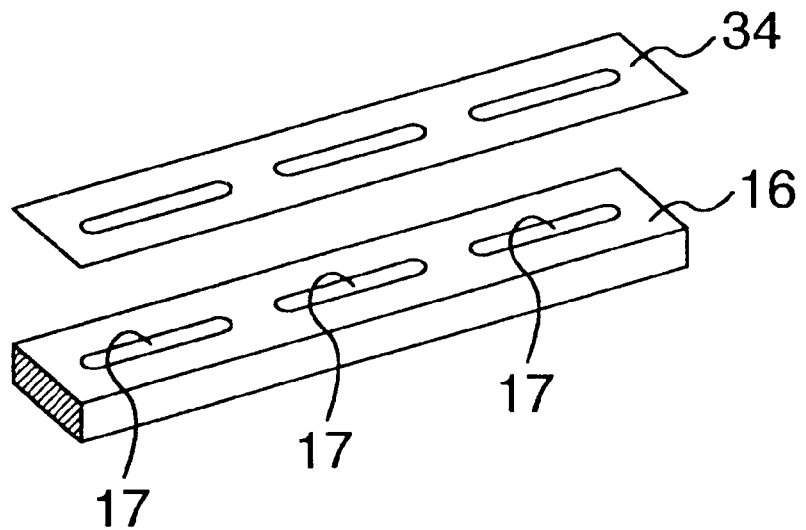
FIG. 4 is a perspective view illustrating a rotor winding conductor and an insulation sheet configuration.

FIG. 4 is a partial perspective view showing an winding conductor 16 and an insulation sheet 34.

The centrifugal force acting to the rotor windings 4 each composed of the winding conductor 16 and the insulation sheet 34 is supported by the wedge 19 via the insulation block 18. The rotor windings 4 are surrounded by the insulation block 18, slot insulation 20, and spacer 21 made of a material with its good electric insulation resistance characteristics, and are electrically insulated from the rotor 1. A cooling fluid in which the sub-slot is guided in an axial direction is supplied to a radial flow passage 17 comprising ventilation holes of the winding conductor 16, holes of the insulation sheet 34 and the holes of the insulation block 18 and wedge 19 in order to cool the rotor windings 4.

Figure 5:
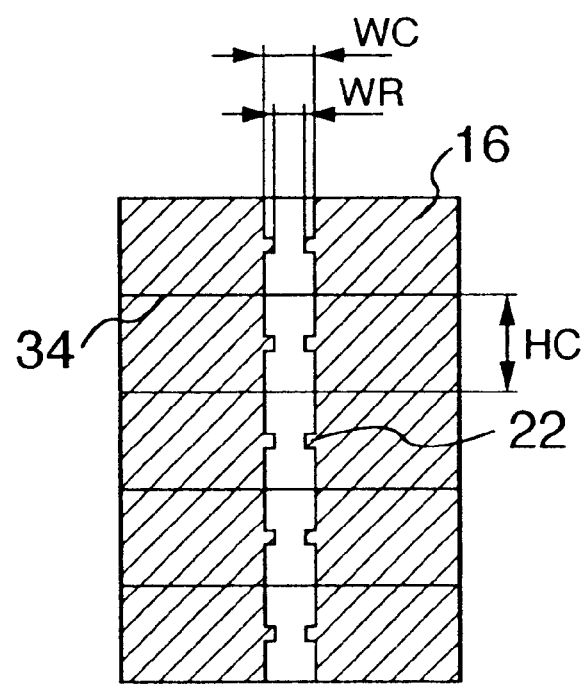
FIG. 5 is a view illustrating a partial cross section of the rotor windings according to one embodiment of the present invention.

FIG. 5 shows one embodiment of the radial flow passage according to the present invention.

In the illustrative embodiment, a rib shaped projection 22 is provided on the inner face of each winding conductor 16. The projection 22 serves to produce distortion in the flow of a wall face in the ventilation flow passage. The flow in the vicinity of the wall face is released at the rib shaped projection 22, and the thus released flow adheres to the wall face on the rib rear side. In this manner, a strength of the flow distortion in the vicinity of the wall face increases, and the ventilation resistance and heat transmission increase. The ventilation resistance and heat transmission are a function of a ratio "E/P" of a height "E=(WC−WR)/2" of the projection against a projection pitch "P", where the hole width of the projection part against the hole width of the ventilation hole WC is defined as WR.

Figure 6:
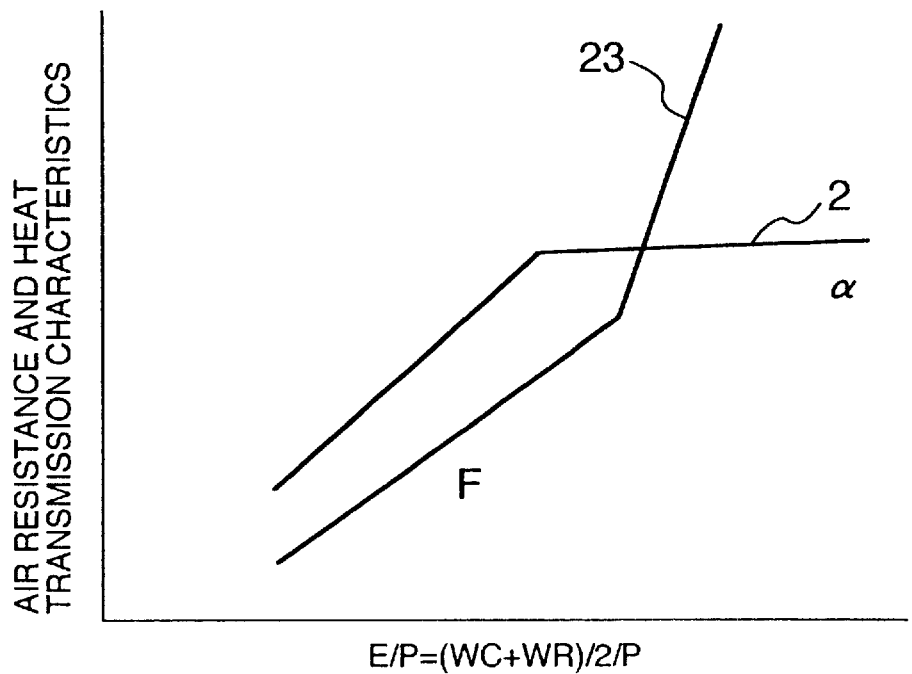
FIG. 6 is a view showing tendency of a ventilation resistance and heat transmission characteristics according to one embodiment of the present invention.

FIG. 6 schematically shows an outlook of a change in ventilation resistance and heat transmission against E/P.

A ventilation resistance 23 and a heat transmission 24 increase with an increase in E/P. If the E/P increases excessively, the ventilation resistance 23 increases rapidly, and the heat resistance does not increase so much. This is because a distance in a point at which a flow is released at a rib and a point at which the flow adheres to the wall face of the ventilation passage is greater than the projection pitch P, and the released flow hardly adheres to the wall face.

Figure 7:
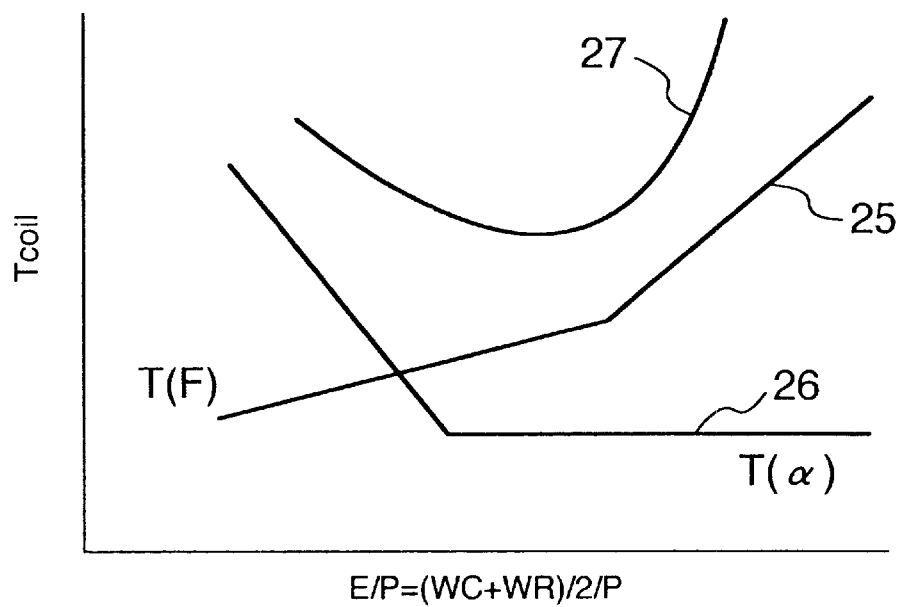
FIG. 7 is a view showing tendency of a projection height and winding temperature of a radial flow path according to one embodiment of the present invention.

FIG. 7 shows a relationship between the E/P and a winding temperature Tcoil when a conductor are laminated.

Tcoil can be expressed by the formula below wherein a heat rate of the windings is defined as W:

$$Tcoil = W/(\rho \cdot Q \cdot Cp) + W/(A\alpha)$$

where $\rho$ denotes a density of a cooling fluid; Q denotes a flow rate of the cooling fluid; and a denotes a heat transfer coefficient at the inner face of the ventilation passage. A first term $(W/(\rho \cdot Q \cdot Cp))$ is a term that denotes a temperature rise of the cooling fluid; a second term $(W/(A\alpha))$ is a term that denotes a temperature rise due to heat transfer at the inner face of the ventilation passage against the cooling fluid. In FIG. 7, the former is designated by solid line 25, and the latter is designated by solid line 26. When the E/P increases, the flow rate of the cooling fluid decreases with an increase in ventilation resistance, and the temperature of the cooling fluid rises. On the other hand, the temperature rise due to heat transmission decreases with an increase in E/P. If the E/P increases excessively, it becomes substantially irrelevant to a value of the E/P. The winding temperature Tcoil is equal to a sum of these values. Thus, as designated by solid line 27, Tcoil is set to a relative minimum at a predetermined E/P. Therefore, it is desirable that the E/P be determined so that a value of Tcoil becomes a relative minimum.

Figure 8:
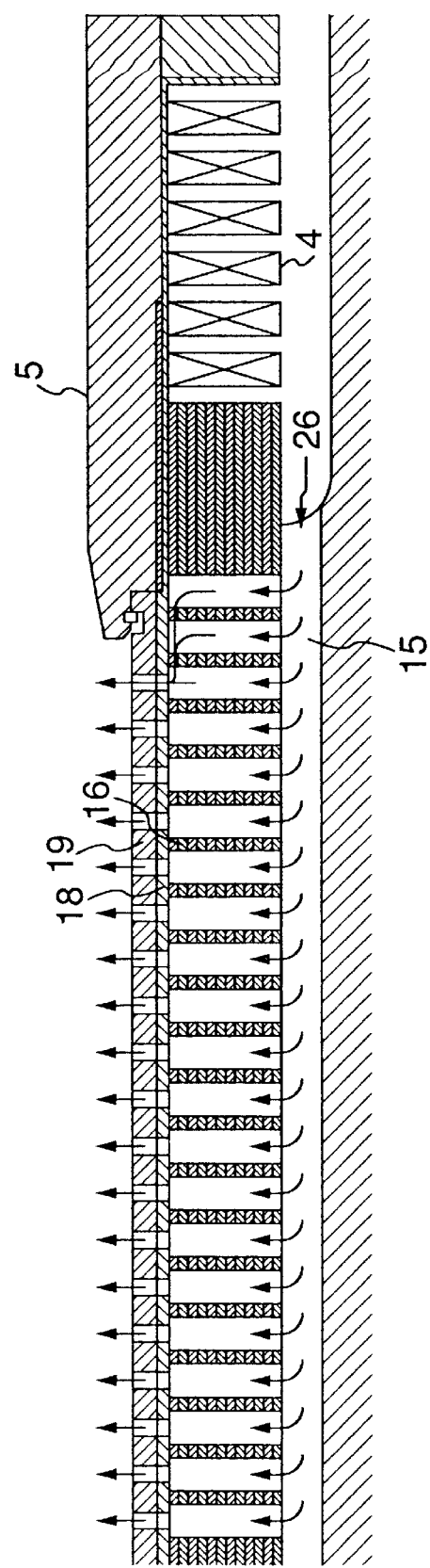
FIG. 8 is a sectional structural view of a rotor employing a radial cooling system to which the present invention is applied.

FIG. 8 is an axial cross section showing a rotor of a rotary electric power generator to which the present invention is applied.

Figure 9:
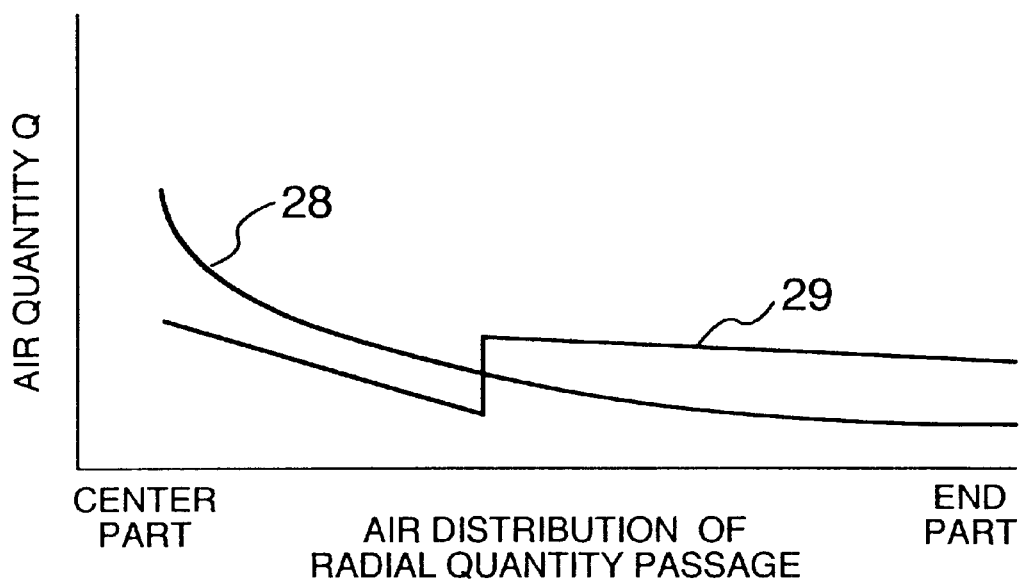
FIG. 9 is a view showing tendency of the air distributions when the present invention is applied and is not applied to the rotor shown in FIG. 8.
Figure 10:
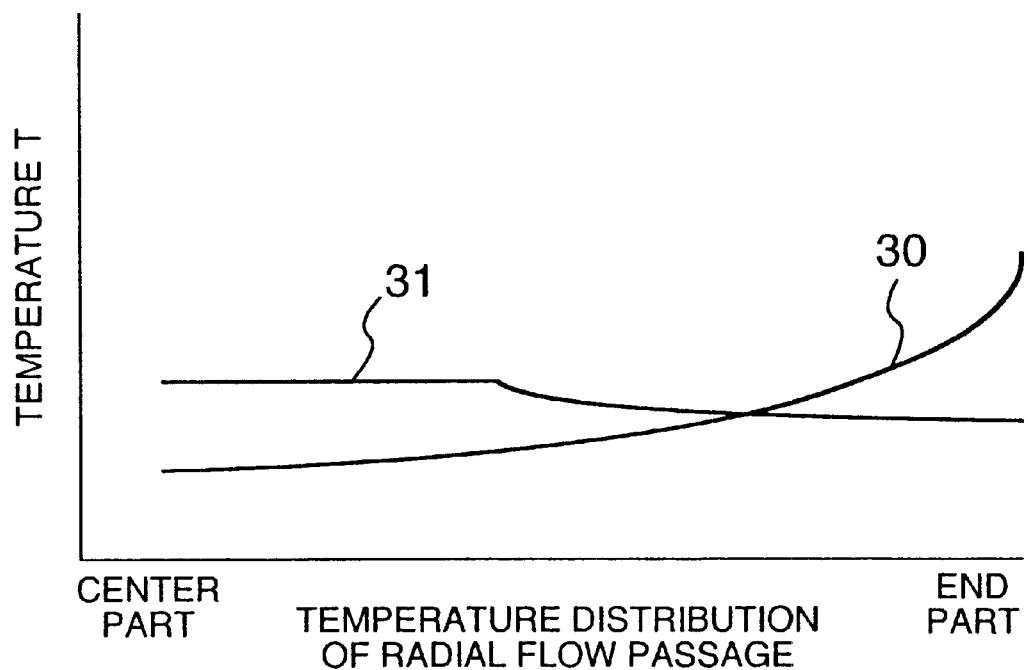
FIG. 10 is a view showing tendency of the temperature distributions when the present invention is applied and is not applied to the rotor shown in FIG. 8.

In the drawing, a left end denotes a center of the rotor. A cooling air 26 is axially supplied from an inlet part through a slot 15, and is diverged into a number of radial flow passages 17. In FIG. 9 and FIG. 10, there are shown a position from the center to the end on a horizontal axis and the air distribution Q of each radial flow passage 17 and a conductor temperature distribution T on a longitudinal axis. During divergence from the sub-slot 15 to the radial flow passage 17, there occurs a divergent ventilation resistance that is a function of a ratio between a flow rate of the sub-slot 15 and the flow rate of each radial flow passage 17. This magnitude varies depending on an area ratio of the sub-slot 15 and each radial flow passage 17. In general, the center part is small, and the end part is large. Therefore, in the case where the ventilation resistance of the radial flow passage 17 is constant independent of the axial position of this radial flow passage, there is tendency that a temperature at the center part is lower, and a temperature at the end part is higher, as designated by a solid line 28 shown in FIG. 9.

As a result, as designated by solid line 30 shown in FIG. 10, the temperature at the center part is lower, and the temperature at the end part is higher, which causes non-uniformity in winding temperature distributions. In order to prevent this non-uniformity, it is advisable that the E/P is changed, thereby offsetting the ventilation resistance due to divergence. Specifically, the E/P at the center part is made larger than the E/P at the end part. By doing this, as designated by solid line 29 shown in FIG. 9, the flow rate of the radial flow passage at the center part decreases with an increase in ventilation resistance. On the other hand, the flow rate at the end part increases. When the E/P increases, heat transmission increases to some extent. Thus, even if the flow rate at the center part decreases, the temperature does not rise. As a result, as designated by solid line 31 shown in FIG. 10, a temperature from the center part to the end part can be uniformed.

FIG. 11 shows a method for manufacturing a winding conductor to which the present invention shown in FIG. 4 is applied. The rib structure shown in FIG. 4 can be provided by mechanically processing a hole of the radial flow passage 17. However, there is a problem that this processing makes processing cost too high. To solve this problem, there is provided a method in which the invention shown in FIG. 4 can be applied without keeping the processing cost unchanged in comparison with a conventional processing method. That is, as shown in FIG. 11A, a ventilation hole is punched by perforation using a dice 30. Then, as shown in FIG. 11B, the periphery of the ventilation hole is pressed with a dice 32 having a projection 31 greater than the punched hole by one turn. In this manner, a ventilation hole around a conductor hole is plastically deformed in a direction in which the ventilation hole is reduced A projection plastically deformed inside of this ventilation hole configures a rib shown in FIG. 4 (FIG. 11C). The shape of the projection may not always be rectangular. It is sufficient if the E/P is set to a predetermined value. The projection in the ventilation passage may not always be provided at the conductor itself.

Figure 12:
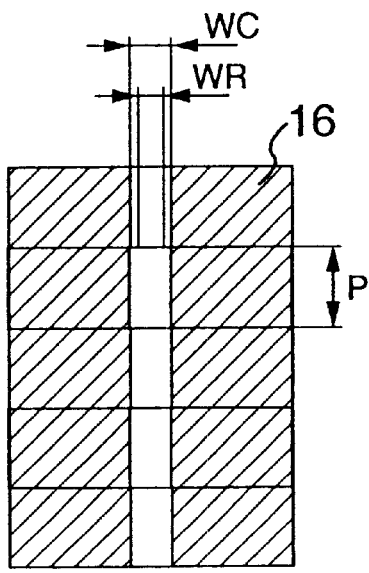
FIG. 12 is a partial cross section showing rotor windings according to another embodiment of the present invention.

FIG. 12 shows another embodiment of insulators between conductors each configuring a projection.

In the illustrative embodiment, the hole width WR of the insulation sheet 34 serving as an insulator between the conductors is constructed so as to be smaller than the hole width WC of the ventilation passage of each conductor. With such configuration, an advantageous effect similar to that shown in FIG. 4 can be attained. In addition, there is provided an advantageous effect that is the same as a case in which a projection is provided at the conductor part by drilling a hole smaller than that of the conductor at an insulator between the conductors. Further, there is provided an advantageous effect that the insulator can be manufactured without increasing the processing steps.

Figure 13:
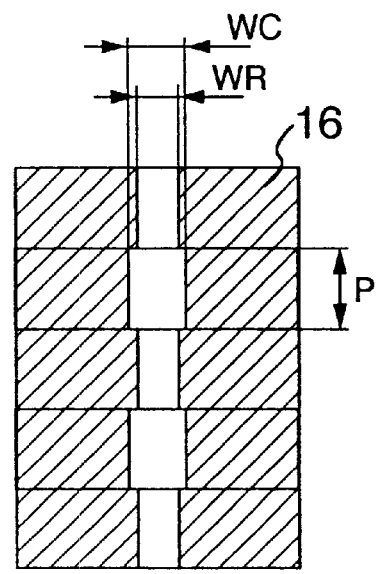
FIG. 13 is a partial cross section showing rotor windings according to another embodiment of the present invention.

FIG. 13 shows another embodiment of the present invention. In FIG. 12, the hole diameter of the insulator between the conductors is configured so as to be smaller than the hole diameter of the conductor. In contrast, in the illustrative embodiment, the hole diameters of the adjacent conductors are alternately changed. In this manner, an advantageous effect substantially identical to that shown in FIG. 4 can be attained. Of course, the similar advantageous effect can be attained by changing the shape of holes of the adjacent holes.

Figure 14:
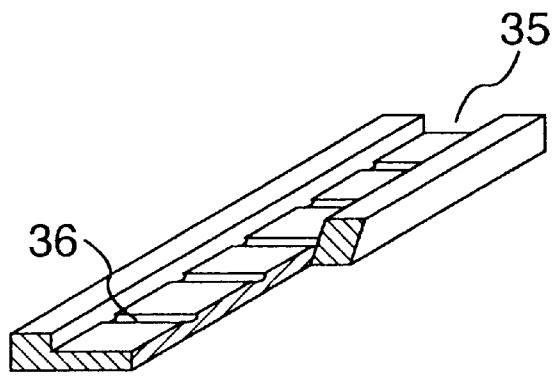
FIG. 14 is a partial cross section showing rotor windings according to another embodiment of the present invention.
Figure 15:
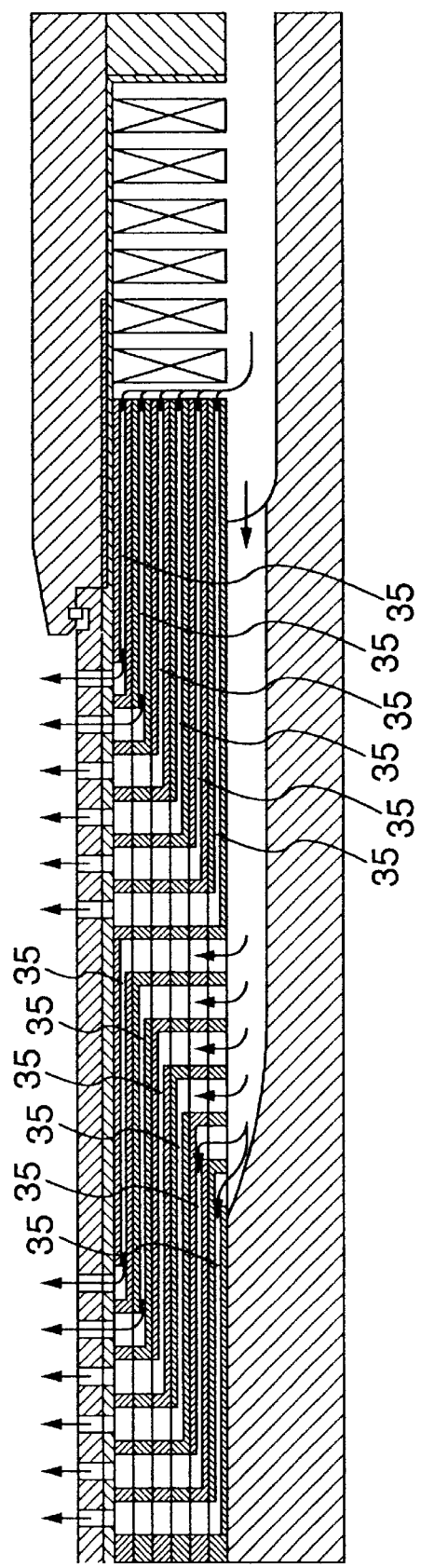
FIG. 15 is a sectional structural view of a rotor including an axial flow ventilation cooling system to which the invention of FIG. 14 is applied.
Figure 16:
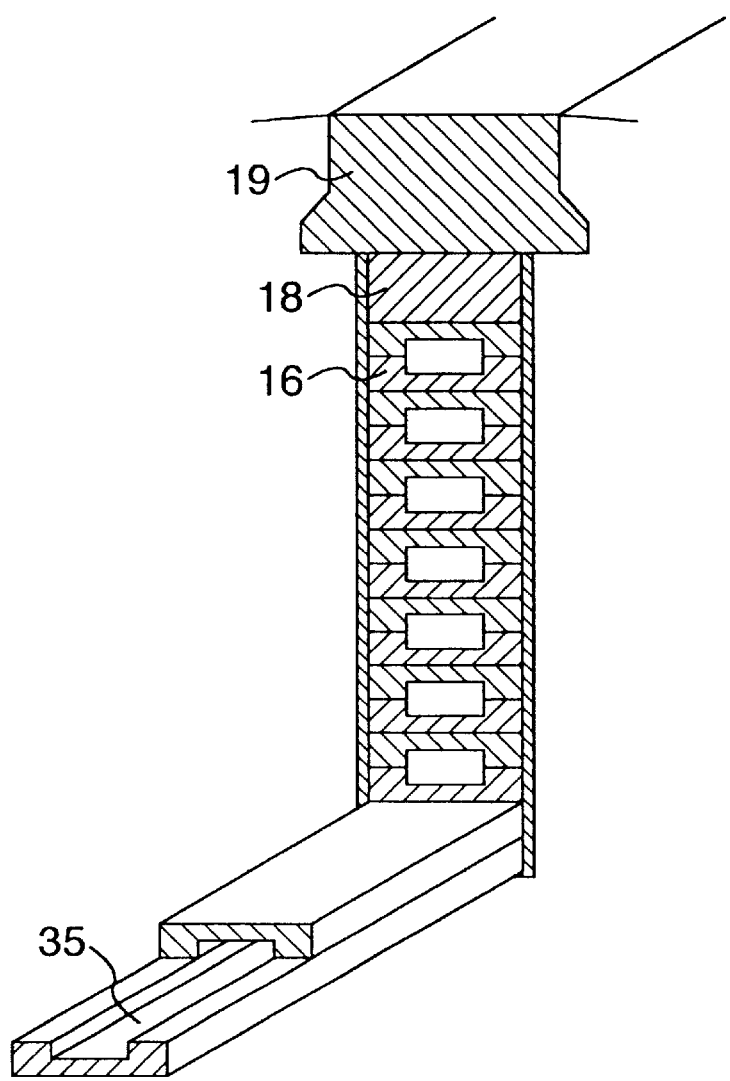
FIG. 16 is a view showing one slot cross section of the rotor shown in FIG. 15.
Figure 17:
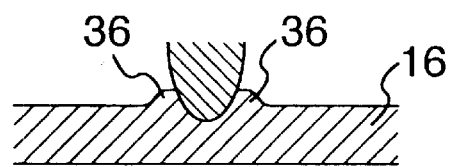
FIG. 17 is a view showing an example of a method for manufacturing a projection of the winding conductor shown in FIG. 14.

FIG. 14 shows another embodiment of the present invention. The figure is a cross section showing a flow passage of one conductor employed for a rotor of a rotary electric power generator including the axial flow cooling flow passage 35 of the conductor as shown in FIG. 15 and FIG. 16. That is, in the configuration shown in FIG. 3, a sub-slot is provided at the lower part of a slot, and a flow passage is formed in an axial direction by means of this sub-slot section. Further, a radial flow passage is provided at a conductor part laminated at the slot part. In contrast, in the illustrative embodiment, an axial flow cooling flow passage 35 is provided in the axial direction of the conductor, and a radial flow passage 17 is provided intermediately of the conductor. A waveform projection 36 is provided at the inner face of the flow passage. This projection 36, as shown in FIG. 17, can be formed by pressing a protrusive dice to the inner face of the ventilation flow passage. A hole is produced by this press, and the periphery of this hole rises in an opposite direction, which serves as a projection against the flow. This projection may not be always vertical to the flow, and may be oblique.

Figure 18:
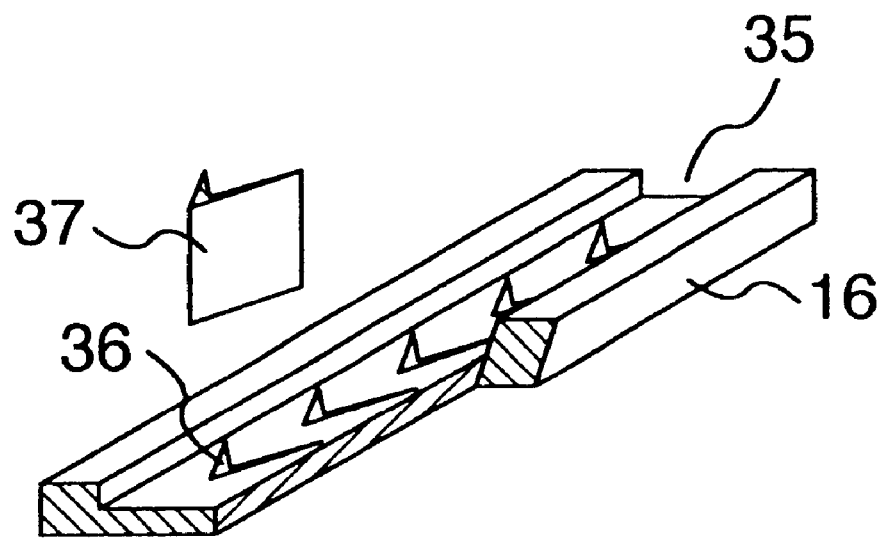
FIG. 18 is a view illustrating another embodiment of the invention shown in FIG. 14.

FIG. 18 shows an example when a V shaped groove and a projection 36 are provided against the flow. Such groove and projection can be easily formed by cutting the inner face of the ventilation passage by a byte 37 with its acute angle.

Figure 19:
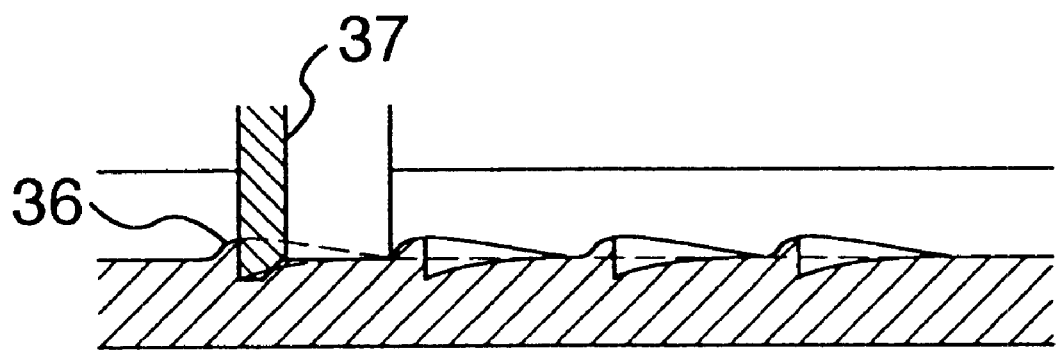
FIG. 19 is a view showing an example of the method for manufacturing a projection of the winding conductor shown in FIG. 18.

FIG. 19 is a cut sectional view showing a case in which a longitudinal projection is inclined against the flow, whereby a so called longitudinal vortex against the flow can be produced. In this manner, a significant effect of heat transfer can be attained without increasing a ventilation resistance so much.

According to the present invention, there can be provided a turbine electric power generator with its high reliability and large capacity at a low cost in which a temperature rise due to rotor and stator heating without increasing any manufacturing cost.

What is claimed is:

1. A rotary electric power generator, comprising:
   a rotor;
   axial windings on the peripheral face of the rotor disposed with intervals in a circumferential direction at both sides of the magnetic pole part of the rotor;
   sub-slots opening at the bottom of the winding slots;
   rotor windings arranged coaxially with respect to the magnetic pole, extending at and outside of the winding slots, and having conductor insulation materials laminated alternately thereon;
   wedges in which the rotor windings are fixed to the rotor in the winding slots;
   a retaining ring on the rotary shaft peripheral side of the rotary windings, the retaining ring extending outside of the winding slots at both ends of the rotor; and
   insulation blocks of the rotor windings interposed between the wedges or the retaining rings, and the rotor windings having flow passages;
   wherein the flow passages include at least one of (a) a number of radial flow passages passing from the sub-slots to the insulation blocks and the wedges, a flow passage area for the radial flow passage being changed with a predetermined pitch, and a ratio of a maximum area to a minimum area for the radial flow passage being no greater than 2, and (b) a number of longitudinal flow passages and radial flow passages which communicate from a rotor inner diameter side with the insulation blocks and the wedges, the longitudinal and radial flow passages being combined with each other, and the longitudinal flow passages each have a protrusive projection provided with respect to the flow direction of the cooling fluid.

2. The rotary electric power generator as set forth in claim 1, wherein the hole widths of the adjacent conductors are changed alternately.

3. The rotary electric power generator as set forth in claim 1, wherein the longitudinal flow passage having a protrusive cut projection has a V shaped tip end provided with respect to an upstream direction of the cooling fluid.

4. A rotor of the rotary electric power generator, comprising:
   a rotor;
   axial winding slots on the peripheral face of the rotor disposed with intervals in a circumferential direction at both sides of the magnetic pole part of the rotor;
   sub-slots opening at the bottom of the winding slots;
   rotor windings arranged coaxially with respect to the magnetic pole, extending at and outside of the winding slots, and having conductor insulation materials laminated alternately thereon;
   wedges in which the rotor windings are fixed to the rotor in the winding slots;
   a retaining ring on the rotary shaft peripheral side of the rotary windings, the retaining ring extending outside of the winding slots at both ends of the rotor; and
   insulation blocks of the rotor windings interposed between the wedges or the retaining rings, the rotor windings having a ventilation flow passage in which a number of longitudinal flow passages and radial flow passages communicates from a rotor inner diameter side with the insulation blocks and the wedges, and the longitudinal and radial flow passages are combined with each other,
   wherein the longitudinal flow passages each having a protrusive projection are provided with respect to the flow direction of the cooling fluid.

5. The rotary electric power generator as set forth in claim 4, wherein the longitudinal flow passage having a protrusive cut projection with its V shaped tip end is provided with respect to an upstream direction of the cooling fluid.

6. A rotary electric power generator, comprising:
   a rotor;
   axial winding slots on the peripheral face of the rotor disposed with intervals in a circumferential direction at both sides of the magnetic pole part of the rotor;
   sub-slots opening at the bottom of the winding slots;
   rotor windings arranged coaxially with respect to the magnetic pole, extending at and outside of the winding slots, and having conductor insulation materials laminated alternately thereon;
   wedges in which the rotor windings are fixed to the rotor in the winding slots;
   a retaining ring on the rotary shaft peripheral side of the rotary windings, the retaining ring extending outside of the winding slots at both ends of the rotor; and insulation blocks of the rotor windings interposed between the wedges or the retaining rings, the rotor windings having a number of radial flow passages passing from the sub-slots to the insulation blocks and the wedges, wherein a flow passage area for the radial flow passage is changed with a predetermined pitch and a ratio of a maximum area to a minimum area for the radial flow passage is 2 or less.

7. The rotary electric power generator as set forth in claim 6, wherein the hole widths of the adjacent conductors are changed alternately.

* * * * *